US 6,606,223 B2

(12) United States Patent
Ooi et al.

(10) Patent No.: US 6,606,223 B2
(45) Date of Patent: Aug. 12, 2003

(54) VOICE COIL MOTOR DUMMY MAGNET

(75) Inventors: Tak Koon Ooi, Singapore (SG); Choon Kiat Lim, Singapore (SG); Chor Shan Cheng, Singapore (SG); Yi Ren Hong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 140 days.

(21) Appl. No.: 09/836,031

(22) Filed: Apr. 17, 2001

(65) Prior Publication Data

US 2002/0181159 A1 Dec. 5, 2002

Related U.S. Application Data

(60) Provisional application No. 60/235,593, filed on Sep. 27, 2000.

(51) Int. Cl.[7] .................................................. G11B 5/55
(52) U.S. Cl. ................................. 360/264.9; 360/264.8
(58) Field of Search ........................... 360/264.7, 264.8, 360/264.9, 264.3

(56) References Cited

U.S. PATENT DOCUMENTS

| | | | |
|---|---|---|---|
| 4,620,252 A | 10/1986 | Bauck et al. ............... 360/106 |
| 4,939,711 A | 7/1990 | Yoda ........................... 369/13 |
| 5,016,131 A | 5/1991 | Riggle et al. .............. 360/106 |
| 5,247,410 A | 9/1993 | Ebihara et al. ............ 360/106 |
| 5,260,618 A | 11/1993 | Dunfield et al. ............. 310/154 |
| 5,296,767 A | 3/1994 | Asselin ........................ 310/13 |
| 5,305,169 A | * 4/1994 | Anderson et al. ........ 360/256.2 |
| 5,315,466 A | 5/1994 | Nishimoto et al. ......... 360/106 |
| 5,459,362 A | 10/1995 | Dunfield et al. ............. 310/154 |
| 5,483,397 A | 1/1996 | Gifford et al. ........... 360/97.01 |
| 5,483,400 A | * 1/1996 | Tsujino .................... 360/264.8 |
| 5,557,152 A | * 9/1996 | Gauthier ...................... 310/46 |
| 5,621,591 A | 4/1997 | Rahimi et al. .............. 360/106 |
| 5,659,215 A | * 8/1997 | Dunfield et al. ....... 310/154.21 |
| 5,684,349 A | * 11/1997 | Hara et al. .................... 310/77 |
| 5,822,156 A | * 10/1998 | Suzuki et al. ............. 360/264.9 |
| 5,907,453 A | 5/1999 | Wood et al. .............. 360/97.02 |
| 6,026,064 A | 2/2000 | Izumi et al. ............. 369/44.22 |
| 6,091,579 A | * 7/2000 | Suzuki ..................... 360/264.8 |
| 6,122,139 A | 9/2000 | Sri-Jayantha et al. .... 360/97.02 |
| 2001/0048576 A1 | * 12/2001 | Kazmierczak ........... 360/264.7 |

* cited by examiner

*Primary Examiner*—Brian E. Miller
(74) *Attorney, Agent, or Firm*—Merchant & Gould P.C.

(57) ABSTRACT

A voice coil motor assembly in a disc drive includes first and second pole pieces held in spaced relationship to one another such that a gap is defined therebetween. A permanent magnet is located on the first pole piece within the gap and a dummy magnet is located on the second pole piece across the gap from the permanent magnet. The first and second pole pieces, together with the magnet and the dummy magnet, form a magnetic circuit conducting lines of magnetic flux within the voice coil motor and across the gap. The dummy magnet acts to encourage magnetic flux to flow across the gap in a manner such that the roll and pitch torque constants of the voice coil motor are reduced.

13 Claims, 7 Drawing Sheets

VOICE COIL MOTOR DUMMY MAGNET

RELATED APPLICATIONS

This application claims priority of U.S. provisional application Ser. No. 60/235,593, filed Sep. 27, 2000.

FIELD OF THE INVENTION

This application relates generally to magnetic disc drives and more particularly to a dummy magnet in a voice coil motor assembly for reducing the pitch and roll torque constants of the voice coil motor.

BACKGROUND OF THE INVENTION

As shown in FIG. 1, typical modem hard disc drives 100 comprise one or more rigid discs 108 that are coated with a magnetizable medium and mounted on the hub 106 of a spindle motor for rotation at a constant high speed. Information is stored on the discs in a plurality of concentric circular tracks by an array of transducers ("heads") 118 mounted to a controllably positionable radial actuator assembly 110 for movement relative to the discs.

Typically, such radial actuators 108 employ a voice coil motor 124 to position the heads 118 with respect to the disc surfaces. The heads 118 are mounted via flexures 116 at the ends of one or more actuator arms 114 which project outward from an actuator body 120. The actuator body pivots about a cartridge bearing assembly 112 mounted to the disc drive base plate 102 at a position closely adjacent to the outer extreme of the discs so that the heads move in a plane parallel with the surfaces of the discs.

The voice coil motor 124 includes a coil 126 mounted radially outward from the cartridge bearing assembly 112, the coil being immersed in the magnetic field of a magnetic circuit of the voice coil motor. The magnetic circuit comprises one or more permanent magnet pairs 128 and magnetically permeable pole pieces 140. When current is passed through the coil, an electromagnetic field is established which interacts with the magnetic field of the magnetic circuit such that the coil, as well as the actuator(s), experience rotational forces or torques about the axis of the cartridge bearing assembly 112.

As shown in FIG. 2, there are typically three principal torques experienced by the actuator assembly 110 and voice coil motor 124 as a result of the application of current to the coil. The first torque, often called the main torque, causes the coil 126 and the actuator arm(s) 114 to rotate about a central axis 250 (z-axis) of the cartridge bearing assembly 112, as shown by arrow 252. The second torque, referred to as the roll torque, causes the coil 126 and the actuator arms(s) 114 to rotate or twist about an axis 254 (x-axis) of the cartridge bearing assembly 112, as shown by arrow 256. The third torque, referred to as pitch torque, causes the coil 126 and the actuator arm(s) 114 to rotate or twist about an axis 258 (y-axis) of the cartridge bearing assembly 112, as shown by arrow 260. As is known, the main torque is the primary means by which the voice coil, and thus the head, are moved radially across the disc(s) 108. Stated another way, the main torque is a desired force which causes the actuator(s) and head(s) to move in a plane parallel with the disc(s) 108. In contrast, both the roll and the pitch torques cause motions in the actuator arms(s), head(s), and coil 126 which are not parallel to the plane of the disc(s). As such, the roll and the pitch torques adversely affect the head slider's ability to maintain optimal flying height and to stay parallel to the disc(s) over the data tracks, thereby interfering with the read/write operation of the head in the disc drive.

Another problem associated with excessive pitch and roll torques in a disc drive relates to the introduction of torque induced noise into the disc drive's servo positioning system. A closed loop digital servo system such as disclosed in U.S. Pat. No. 5,262,907, issued Nov. 16, 1993 to Duffy et al., assigned to the assignee of the present invention, is typically utilized to maintain the position of the heads with respect to the tracks. Such a servo system obtains head position information from servo blocks written to the tracks during disc drive manufacturing to maintain a selected head over an associated track during a track following mode of operation. A seek mode of operation, which comprises the initial acceleration of a head away from an initial track and the subsequent deceleration of the head towards a destination track, is also controlled by the servo system. Such seek operations are typically velocity controlled, in that the velocity of the head is repetitively measured and compared to a velocity profile, with the current applied to the coil being generally proportional to the difference between the actual and profile velocities as the head is moved toward the destination track.

A continuing trend in the industry is to provide disc drives with ever increasing data storage and transfer capabilities, which in turn has led to efforts to minimize the overall time required to perform a disc drive seek operation. A typical seek operation includes an initial overhead time during which the disc drive services its own internal operations, a seek time during which the head is moved to and settled on the destination track, and a latency time during which the drive waits until a particular sector on the destination track reaches the head as the discs rotate relative to the heads.

Seek times have typically been minimized through the application of relatively large amounts of current to the coil during the acceleration and deceleration phases of a seek operation. One way of reducing seek time is to increase the relative amount of current to the coil, thus causing an increase in the main torque and a resulting increase rotation of the coil, actuator, and head(s) about the cartridge bearing assembly. However, applying an increased current to the coil also increases the associated and unwanted roll and pitch torques.

Another drawback associated with the application of relatively large amounts of current to the coil during the acceleration and deceleration phases of a seek operation is the occurrence of mechanical vibrations in the voice coil motor, and hence the disc drive itself, as a result of the unwanted roll and pitch torques. These vibrations may induce noise into the servo control loop of the disc drive, thus making accurate track following difficult. As will be understood, the negative affects of vibrationally induced noise in the servo system are compounded as the track density or tracks per inch (TPI) of the disc drive is increased. As the general trend in the disc drive industry is to produce disc drives having ever increasing TPI, it is imperative that new methods and techniques are developed to address vibrationally induced servo system noise.

Along with the general trend in the industry to provide disc drives having greater TPI, there is also a trend to reduce the level of acoustic emissions generated by disc drives. A primary source of acoustical emissions from a disc drive is the amplification of the aforementioned vibrations of the voice coil motor by the top cover and by the base of the disc drive. These vibrations occurring in the voice coil motor may be transmitted to the top cover and/or the disc drive base either as sympathetic vibrations or as direct transmissions.

Torques occurring in electric motors such as the voice coil motor are typically defined in terms of the ratio of the output torque of a motor to its input current. This ratio, referred to as the torque constant of the motor, is generally expressed in units of force times length divided by current, or newton meters per ampere (Nm/A). As described above, the voice coil motor normally experiences three primary torques as a result of the application of current to the coil. The response of the actuator and the voice coil motor to the application of current to the coil may, therefore, be expressed in terms of three torque constants: the main torque constant; the roll torque constant; and the pitch torque constant.

Accordingly, there is a need for a voice coil motor assembly that has reduced roll and pitch torque constants but does not significantly increase the manufacturing costs by adding costly parts and/or manufacturing steps.

SUMMARY OF THE INVENTION

Against this backdrop the present invention has been developed. One embodiment of the present invention relates to a data storage device voice coil motor which utilizes a single permanent magnet and a dummy magnet in a magnetic circuit to reduce pitch and roll torques in the voice coil motor. The voice coil motor includes a first pole piece having an inner surface and a second pole piece having an inner surface. The second pole piece is connected to the first pole piece in a manner such that the inner surface of the second pole piece is held in spaced relation with the inner surface of the first pole piece and such that a gap is defined therebetween. In this arrangement, the second pole piece includes a dummy magnet which extends from the inner surface of the second pole piece into the gap. The permanent magnet is positioned within the gap on the inner surface of the first pole piece and a voice coil is positioned in the gap between the dummy magnet and the permanent magnet. The first pole piece, the second pole piece, the dummy magnet, and the permanent magnet form a magnetic circuit having lines of magnetic flux which flow in a substantially perpendicular manner to the surfaces of the dummy and permanent magnets through the gap, thereby reducing the pitch and roll torque constants of the voice coil motor, thus allowing a data storage device employing the voice coil motor to maintain optimal flying height of read/write transducers, to reduce vibrationally induced servo system noise, and to reduce acoustical emissions from the data storage device.

Another embodiment of the present invention relates to a method for reducing roll and pitch torque constants in a voice coil motor in a disc drive, wherein the disc drive includes a base plate, and wherein the voice coil motor includes a first pole piece, a second pole piece, a permanent magnet, and a voice coil. The method includes the steps of providing a stamped dummy magnet in the second pole piece, positioning the second pole piece in spaced relation to the first pole piece such that a gap is defined therebetween, positioning the permanent magnet on the first pole piece within the gap, and positioning the voice coil within the gap between the permanent magnet and the dummy magnet. As with the first embodiment of the present invention, the second embodiment of the present invention forms a magnetic circuit having lines of magnetic flux which flow substantially perpendicular to the surfaces of the dummy and permanent magnets through the gap, thereby reducing the pitch and roll torque constants of the voice coil motor.

These and various other features, as well as advantages which characterize the present invention, will be apparent from a reading of the following detailed description and a review of the associated drawings.

DETAILED DESCRIPTION

In general, the present disclosure describes methods and systems for reducing roll and pitch torque constants of a voice coil motor of a disc drive. More particularly, the present disclosure describes a voice coil motor which employs a single magnet pair in conjunction with a dummy magnet for improving flux alignment in the voice coil motor and thereby reduces the roll torque constant and pitch torque constant of the actuator assembly and voice coil motor of the disc drive.

Figure 1:
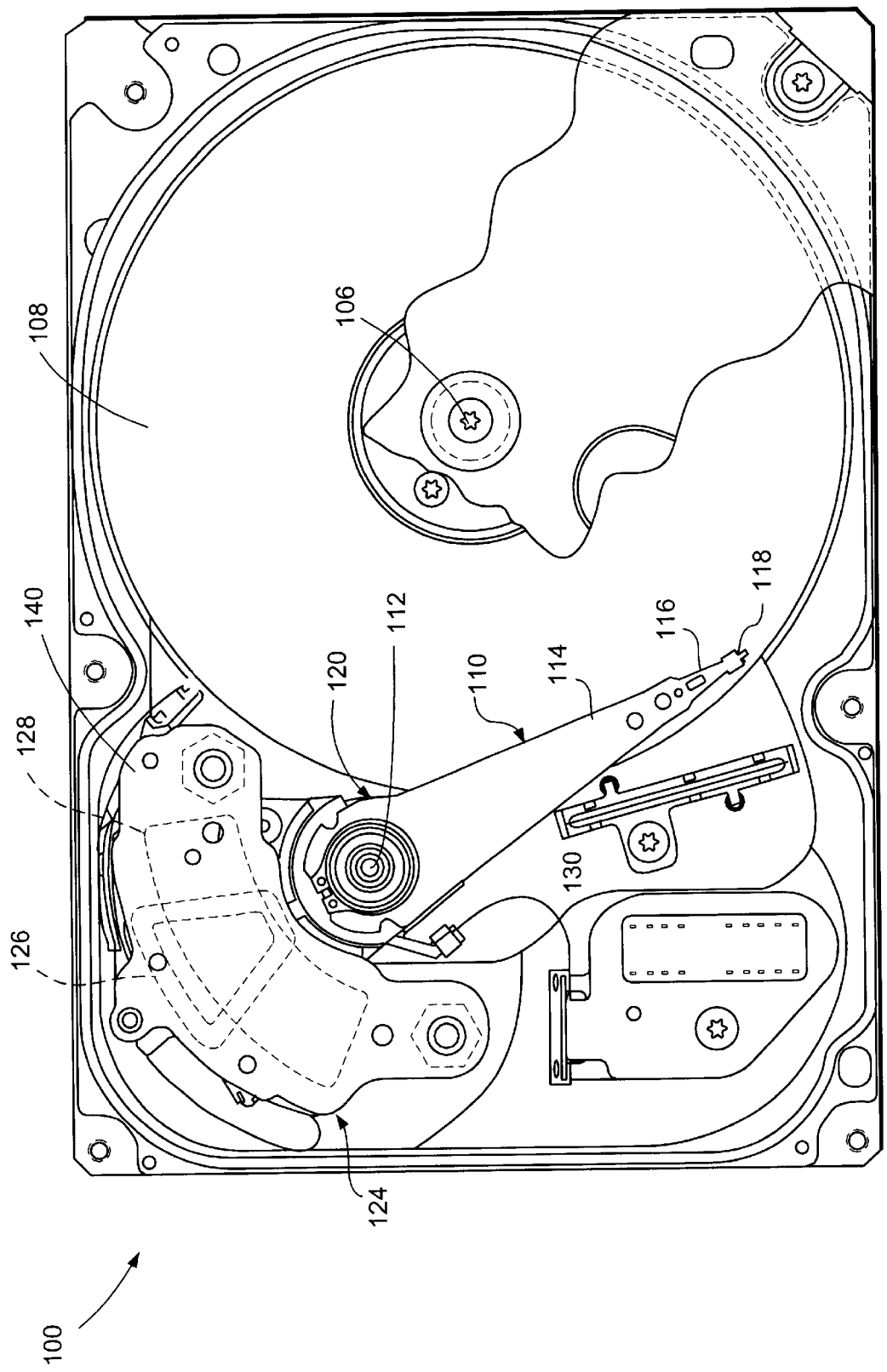
FIG. 1 is a plan view of a disc drive showing the primary internal components of the disc drive.
Figure 2:
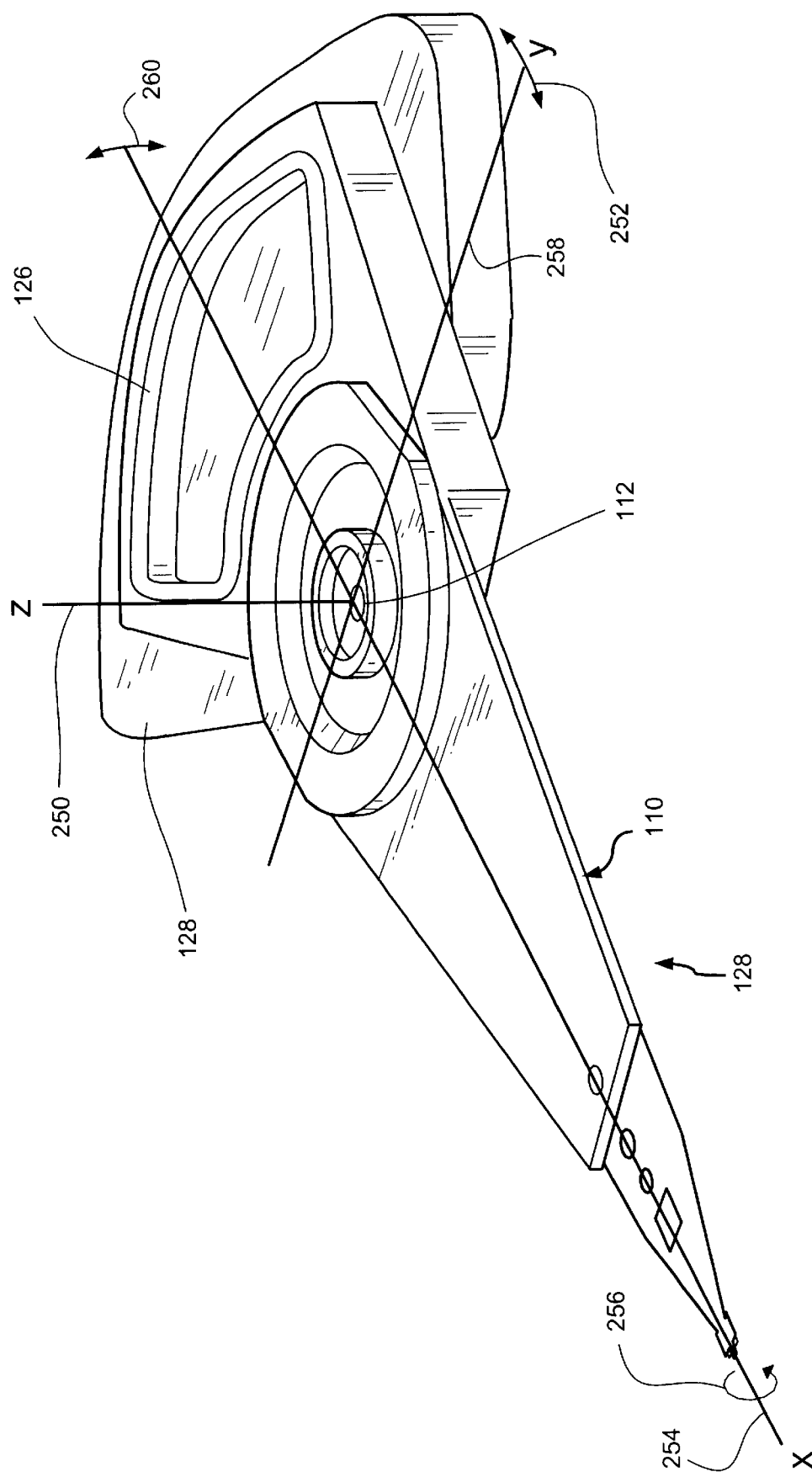
FIG. 2 is a partial perspective view of the actuator assembly and portions of the voice coil motor of the disc drive shown in FIG. 1.
Figure 3:
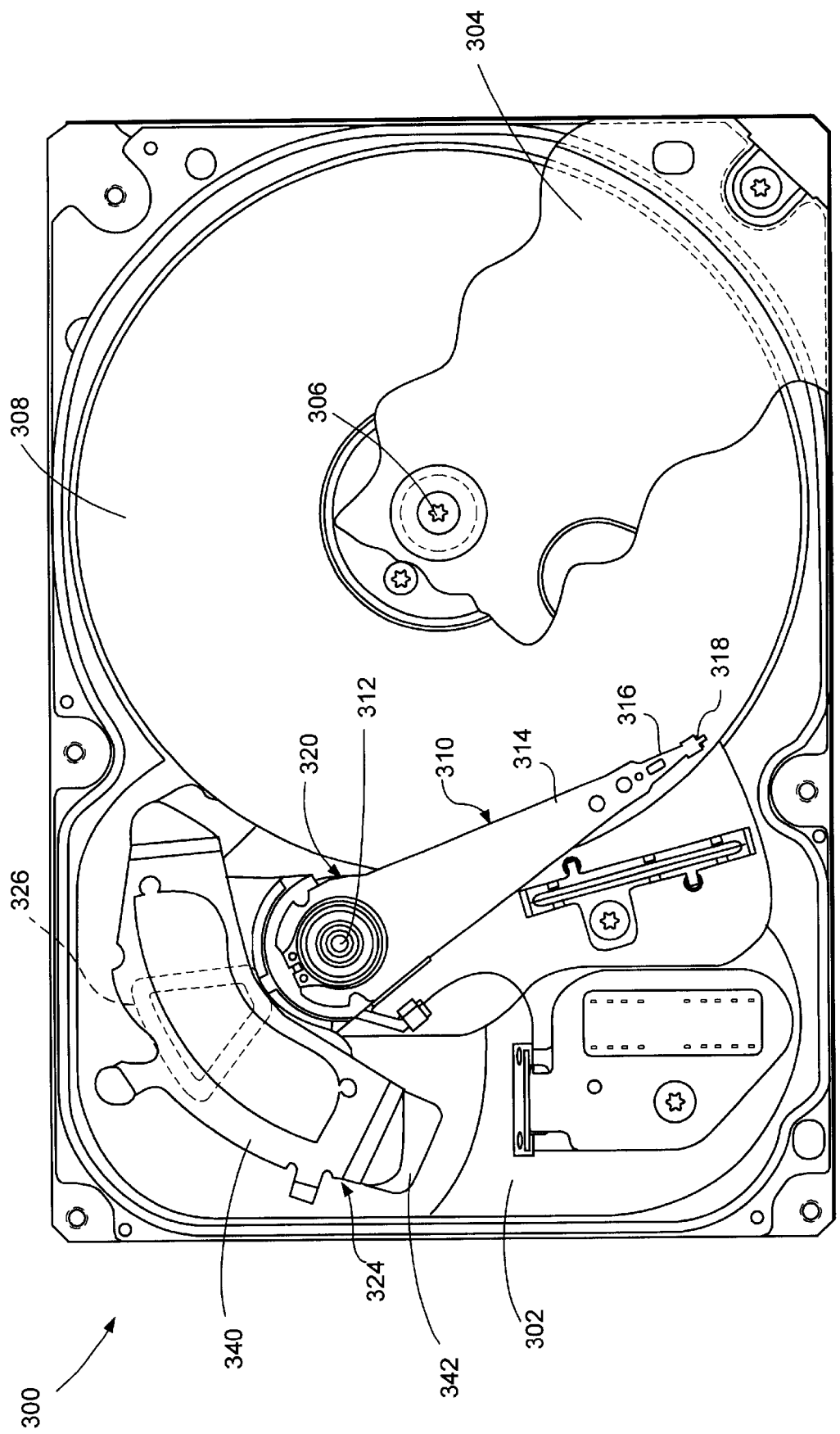
FIG. 3 is a plan view of a disc drive incorporating a preferred embodiment of the present invention showing the primary internal components of the disc drive.

Referring to FIG. 3, a disc drive 300 in which the methods and system of the present invention may be practiced is shown. The disc drive 300 includes a base plate 302 to which various components of the disc drive 300 are mounted. A top cover 304, shown partially cut away, cooperates with the base plate 302 to form an internal, sealed environment for the disc drive in a conventional manner. The components include a spindle motor 306 which rotates one or more discs 308 at a constant high speed. Information is written to and read from tracks on the discs 308 through the use of an actuator assembly 310, which rotates during a seek operation about a bearing shaft assembly 312 positioned adjacent the discs 308. The actuator assembly 310 includes a plurality of actuator arms 314 which extend toward and over the discs 308, with one or more flexures 316 extending from each of the actuator arms 314. Mounted at the distal end of each of the flexures 316 is a head 318 which includes an air bearing slider (not shown) that enables the head 318 to fly in close proximity to a corresponding surface of an associated disc 308.

During a seek operation, the track position of the heads 318 is controlled through the use of a voice coil motor (VCM) 324, which typically includes a coil 326 attached to the actuator assembly 310, an upper pole piece 340, a lower pole piece 342, as well as a permanent magnet pair 328 which establish a magnetic field in which the coil 326 is immersed. The controlled application of current to the coil 326 causes magnetic interaction between the magnet pair 328 and the coil 326 so that the coil 326 moves in accordance with the well-known Lorentz relationship. As the coil 326 moves, the actuator assembly 310 pivots about the bearing shaft assembly 312, and the heads 318 are caused to move across the surfaces of the discs 308.

A flex assembly 330 provides the requisite electrical connection paths for the actuator assembly 310 while allowing pivotal movement of the actuator assembly 310 during operation. The flex assembly typically includes circuitry to which head wires (not shown) are connected. The head wires are routed along the actuator arms 314 and the flexures 316 to the heads 318. The flex assembly circuitry typically controls the write currents applied to the heads 318 during a write operation and amplifies read signals generated by the heads 318 during a read operation. The flex assembly typically terminates at a flex bracket 334 for communication through the base 302 to a disc drive printed circuit board (not shown) mounted to the bottom side of the disc drive 300.

As described previously, unwanted torques, such as pitch torque and roll torque in a VCM, such as VCM 324, often adversely affect the ability of an actuator assembly to maintain an optimal flying height for the head(s) over a disc. Additionally, pitch torque and roll torque are often primary sources of servo system noise and acoustical emissions from a disc drive. As has been observed, pitch torque and roll torque tend to be greater or more pronounced in magnitude in disc drives employing a single magnet pair. One of the causes of the increased pitch torque and roll torque in disc drives employing a single magnet pair is thought to be related to the manner in which the magnetic flux generated by the magnet pair is conducted in the VCM.

Figure 4:
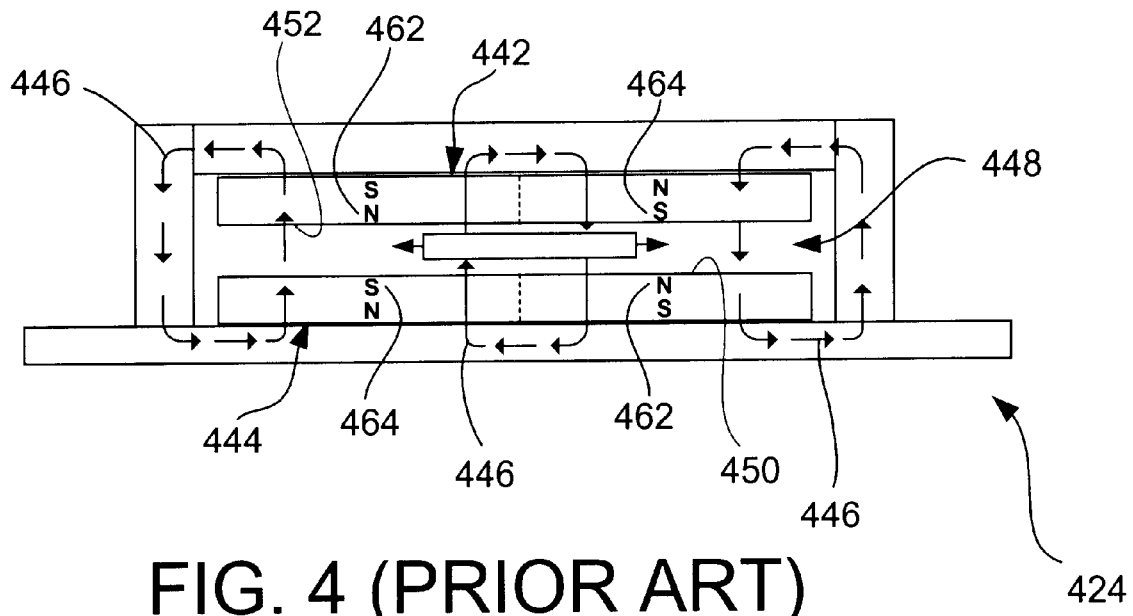
FIG. 4 is a cross-sectional view of a dual magnet pair voice coil motor showing lines of magnetic flux.
Figure 5:
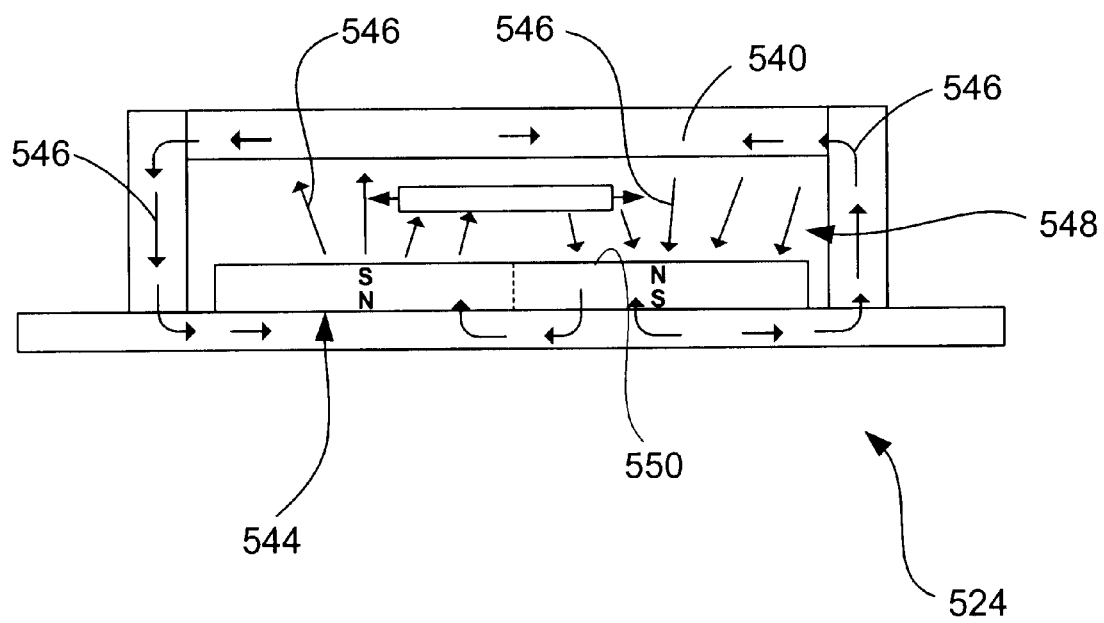
FIG. 5 is a cross-sectional view of a single magnet pair voice coil motor showing lines of magnetic flux.

Generally speaking, magnetic flux lines, such as the magnetic flux lines 446 and 546 shown in FIGS. 4 and 5, are representative of the magnetic fields generated by a magnet or by a current flowing in a wire. With respect to permanent magnets, magnetic flux lines are typically represented by continuous lines of force or flux that emerge from the magnet's north pole piece and enter the magnet's south pole piece. The density of the flux lines indicates the magnitude of the magnetic field generated by the magnet. For example, at the pole pieces of a magnet where the magnetic field is strong, the flux lines are crowded together, or more dense. Farther away, where the magnetic field is weaker, the flux lines fan out, becoming less dense. If a magnetically permeable material, such as steel, is placed in a flux path, the magnetic flux will tend to pass through the steel rather than air surrounding the magnet, as the steel has a higher magnetic permeability.

As shown in FIG. 4, in a typical voice coil motor 424 employing two parallel magnet pairs 442 and 444, the lines of magnetic flux 446 generated by the magnet pairs 442 and 444 tend to cross an air gap 448 located between an upper surface 450 of the lower magnet pair 442 and a lower surface 452 of the upper magnet pair 444 in a generally orthogonal direction to surfaces 450 and 452 of the magnet pairs. It is believed that when these "orthogonal" lines of magnetic flux 446 interact with the flux generated by a coil 426, the resultant torque induced in the VCM 424 is primarily of the direct type, as described above. Put another way, when the flux generated by the parallel magnet pairs 442 and 444 of the VCM 424, interacts with the flux generated by current in the coil 426, little or no pitch torque or roll torque are induced in the VCM 424.

The orthogonal orientation of the flux lines 446 relative to the surfaces 450 and 452 of the magnet pairs 442 and 444 is thought to be due to a "steering" effect that the oppositely facing north 462 and south 464 facing magnetic pole pieces of the magnet pairs 442 and 444 have on the magnetic flux 446. That is, the oppositely facing north 462 and south 464 facing magnetic pole pieces of the magnet pairs 442 and 444 tend to guide the lines of magnetic flux 446 across the air gap 448 located between the magnet pairs 442 and 444 in a generally orthogonal direction to the surfaces 450 and 452 of the magnet pairs.

In contrast, as shown in FIG. 5, it has been observed that without the guiding influence of the oppositely facing south and north magnetic pole pieces, lines of magnetic flux 546 generated in a VCM 524 having a single magnet pair 544 tend to "fringe" as they cross the air gap 548 between the magnet pair 544 and the upper plate 540. That is, the lines of magnetic flux 546 generated in the VCM 524 employing a single magnet pair 544 do not typically remain orthogonal to the upper surface 550 of the magnet pair 544. It is believed that when these "non-orthogonal" flux lines interact with the flux generated by the coil 526, the result is an increase in pitch torque and roll torque in the VCM 524. As such, it has been determined that significant reductions in pitch torque and roll torque in VCMs employing single magnet pairs may be achieved by reducing the occurrence of "non-orthogonal" flux lines in the VCM.

Figure 6:
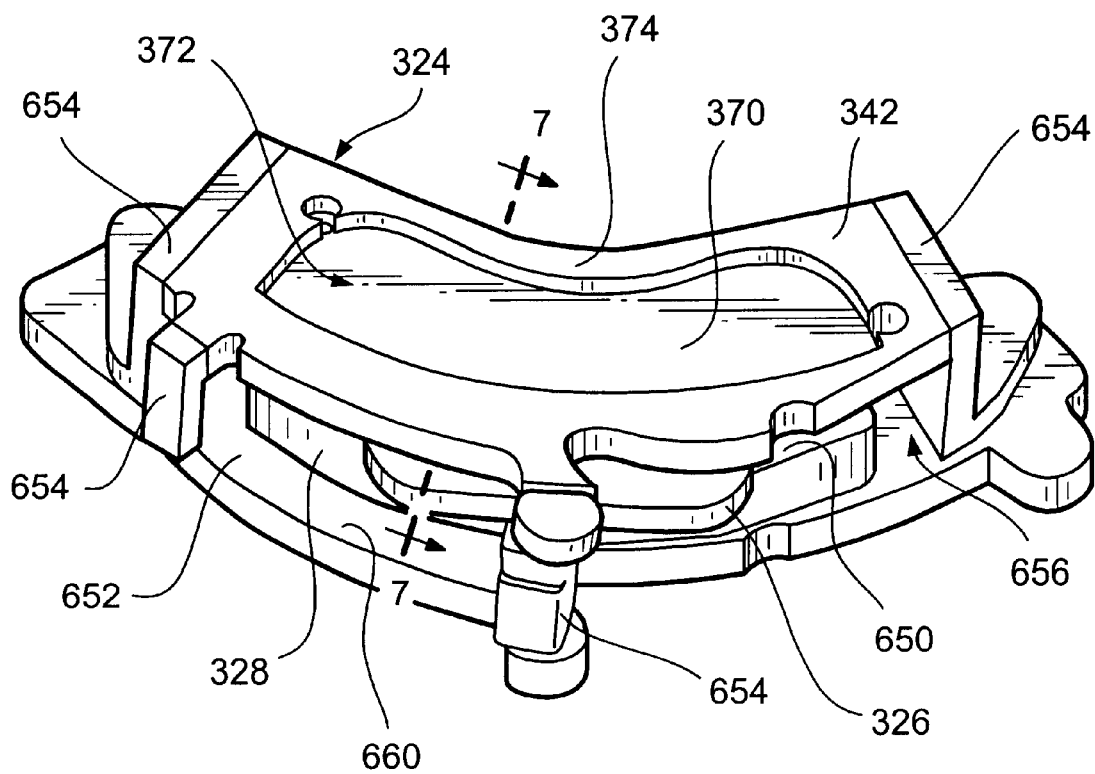
FIG. 6 is a perspective view of the actuator assembly of the disc drive shown in FIG. 3.
Figure 7:
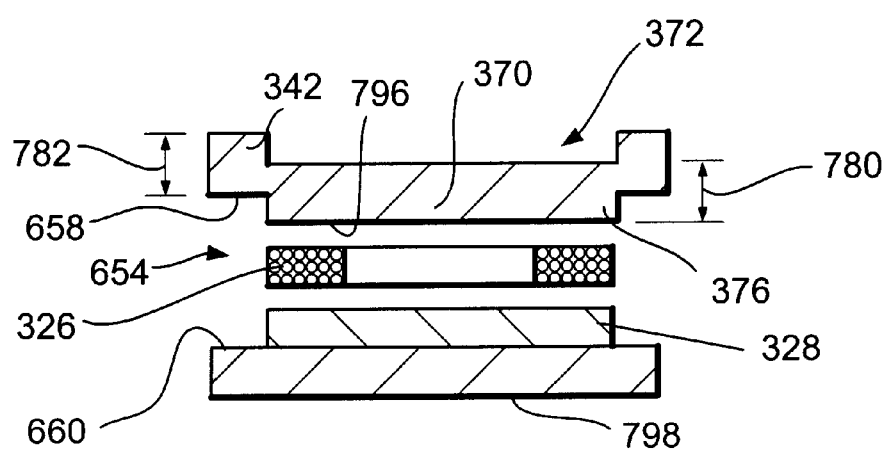
FIG. 7 is a cross-sectional view of the voice coil motor shown in FIG. 6, taken in the plane of line 7—7.

In a first embodiment of the present invention, a "dummy" magnet 370 is employed in a VCM 324 having a single magnet pair 328, as shown in FIGS. 3, 6, and 7. As shown in FIG. 6, the VCM 324 includes an upper pole piece 342 and a lower pole piece 652 supported in spaced relation via spacers 654 to form a gap 656 therebetween. In this embodiment, the magnet pair 328 is positioned on a top surface 660 of the lower pole piece 652.

As shown in FIGS. 6 and 7, the dummy magnet 370 in this embodiment is integral with the upper pole piece 342, extending downward from a bottom surface 658 of the upper pole piece 342 into the gap 656. Additionally, a voice coil 326 is positioned within the gap 656 between the dummy magnet 370 and the permanent magnet pair 328.

The upper pole piece 342, including the dummy magnet 370, may be formed by a metal stamping process, such that a recess 372 is formed in a top surface 374 of the upper pole piece 342 and a protrusion 376 (the dummy magnet) is formed in a bottom surface 658 of the upper pole piece 342 as shown in FIG. 7. The dummy magnet 370 may have approximately the same shape and size as the magnet pair 328. As shown in FIG. 6, the dummy magnet 370 and the magnet pair 328 may be roughly semicircular in shape such that as the coil 326 pivots about the bearing shaft assembly 312 during operation of the VCM 324, the coil 326 will remain substantially between the magnet pair 328 and the dummy magnet 370. Since the dummy magnet 370 in this embodiment is stamped into the upper pole piece 342, the dummy magnet has the same depth 780 as the depth 782 of the upper pole piece 342.

Forming the upper pole piece 342 and the dummy magnet 370 by the aforementioned stamping process allows for the production of precise and repeatable upper pole pieces/dummy magnets in an efficient and cost effective manner. The use of a dummy magnet rather than an upper magnet pair in a VCM also provides significant cost savings, as the cost associated with material and manufacturing of the upper pole pieces/dummy magnets is less than the cost of the material and manufacturing of an upper magnet pair in conjunction with an upper magnet plate. Additionally, the use of a dummy magnet 370 in a single magnet pair VCM, as herein described, provides performance improvements over a single magnet pair VCM which does not employ a dummy magnet by providing a high permeance path for the flow of magnetic flux of the magnet pair 328, thereby directing or steering the flux across the gap 656 such that the flux remains substantially orthogonal to an upper surface 650 of the magnet pair 328. As discussed above, the response of the actuator and the voice coil motor to the application of current to the coil may be expressed in terms of three torque constants: the main torque constant; the roll torque constant; and the pitch torque constant.

Table 1 illustrates the results from magnetic simulation software illustrating the comparative affect on the main torque constant, roll torque constant, and pitch torque constant in a single magnet pair VCM having a dummy magnet 200 stamped into the top pole piece 122 compared to a single magnet pair VCM having no dummy magnet.

TABLE 1

|  | Main Torque Constant (Nm/A) | Roll Torque Constant (Nm/A) | Pitch Torque Constant (Nm/A) |
| --- | --- | --- | --- |
| VCM 120 without dummy magnet 200 | 0.03834 | 0.00122 | 0.00652 |
| VCM 120 with dummy magnet 200 | 0.03822 | 0.00118 | 0.005829 |
| Percent Change | −0.3 | −3.4 | −18.8 |

Figure 8:
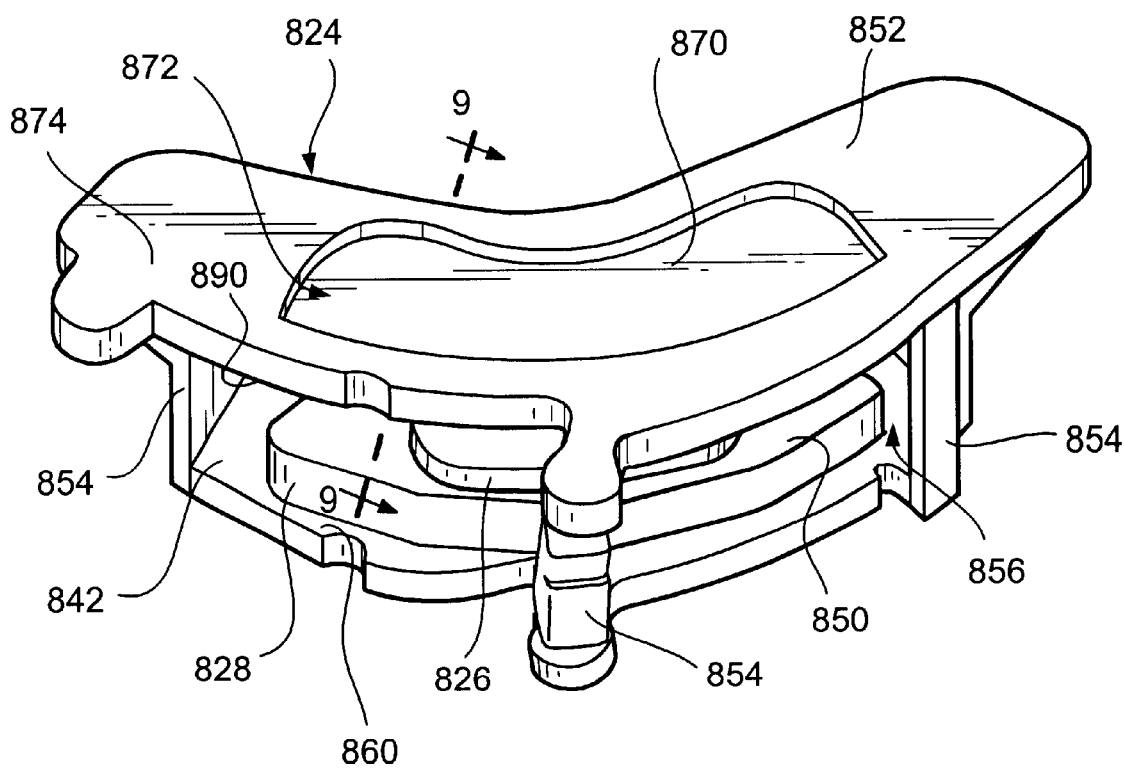
FIG. 8 is a perspective view of an alternative embodiment of the actuator assembly of the disc drive shown in FIG. 3.
Figure 9:
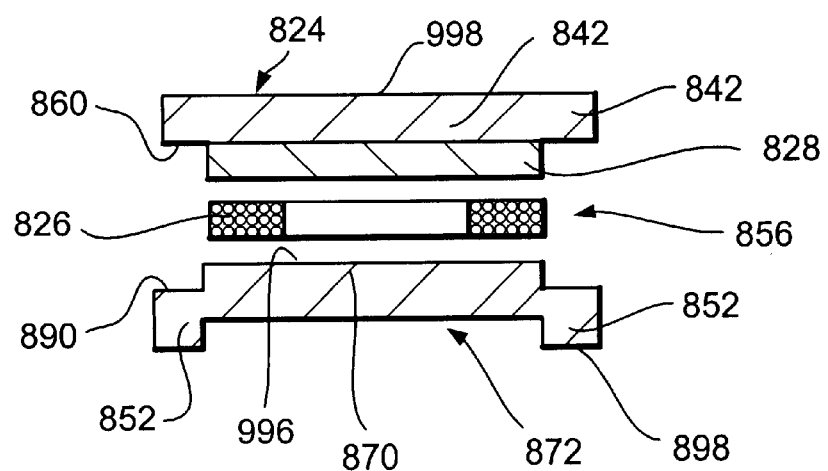
FIG. 9 is a cross-sectional view of the voice coil motor shown in FIG. 8, taken in the plane of line 9—9.

A second embodiment of the present invention is illustrated in FIGS. 8 and 9. FIG. 8 illustrates a bottom perspective view of a VCM 824 embodying a second embodiment of the present invention. For illustration purposes, the VCM 824 of this embodiment of the present invention is shown in FIGS. 8 and 9 as being disconnected from a disc drive. It is to be understood that in operation the VCM illustrated in FIG. 8 may be attached in a conventional manner to a base plate of a disc drive (such as the base plate 302 of disc drive 300) such that a lower surface 886 of the VCM 824 is in contact with an upper surface of the base plate of the disc drive.

As shown in FIGS. 8 and 9, the VCM 824 includes an upper pole piece 842 and a lower pole piece 852 supported in spaced relation via spacers 854 to form a gap 856 therebetween. In this embodiment, a single magnet pair 828 is positioned on a bottom surface 860 of the upper pole piece 842.

As shown in FIGS. 8 and 9, the dummy magnet 870 in this embodiment may be integral with the lower pole piece 852, extending upward from a top surface 890 of the lower pole piece 852 into the gap 856. Additionally, a voice coil 826 is positioned within the gap 656 between the dummy magnet 370 and the permanent magnet pair 328. The lower pole piece 856, including the dummy magnet 870, may be formed by a metal stamping process, such that a recess 872 is formed in a bottom surface 874 of the lower pole piece 852 and a protrusion 876 (the dummy magnet) is formed in a top surface 890 of the lower pole piece 842, as shown in FIG. 8. The dummy magnet 870 may have approximately the same shape and size as the magnet pair 828. As shown in FIG. 8, the dummy magnet 870 and the magnet pair 828 may be roughly semicircular in shape such that as a coil 826 pivots about a bearing shaft assembly during operation of the VCM 824, the coil will remain substantially between the magnet pair 828 and the dummy magnet 870.

Similar to the first embodiment of the present invention, forming the lower pole piece 852 and the dummy magnet 870 by the aforementioned stamping process allows for the production of precise and repeatable upper pole pieces/dummy magnets in an efficient and cost effective manner. Similarly, the use of a dummy magnet 870 in a single magnet pair VCM, as described, provides performance improvements over a single magnet pair VCM which does not employ a dummy magnet by providing a high permeance path for the flow of magnetic flux of the magnet pair 828, thereby directing or steering the flux across the gap 856 such that the flux remains substantially orthogonal to an upper surface 850 of the magnet pair 328.

Figure 10:
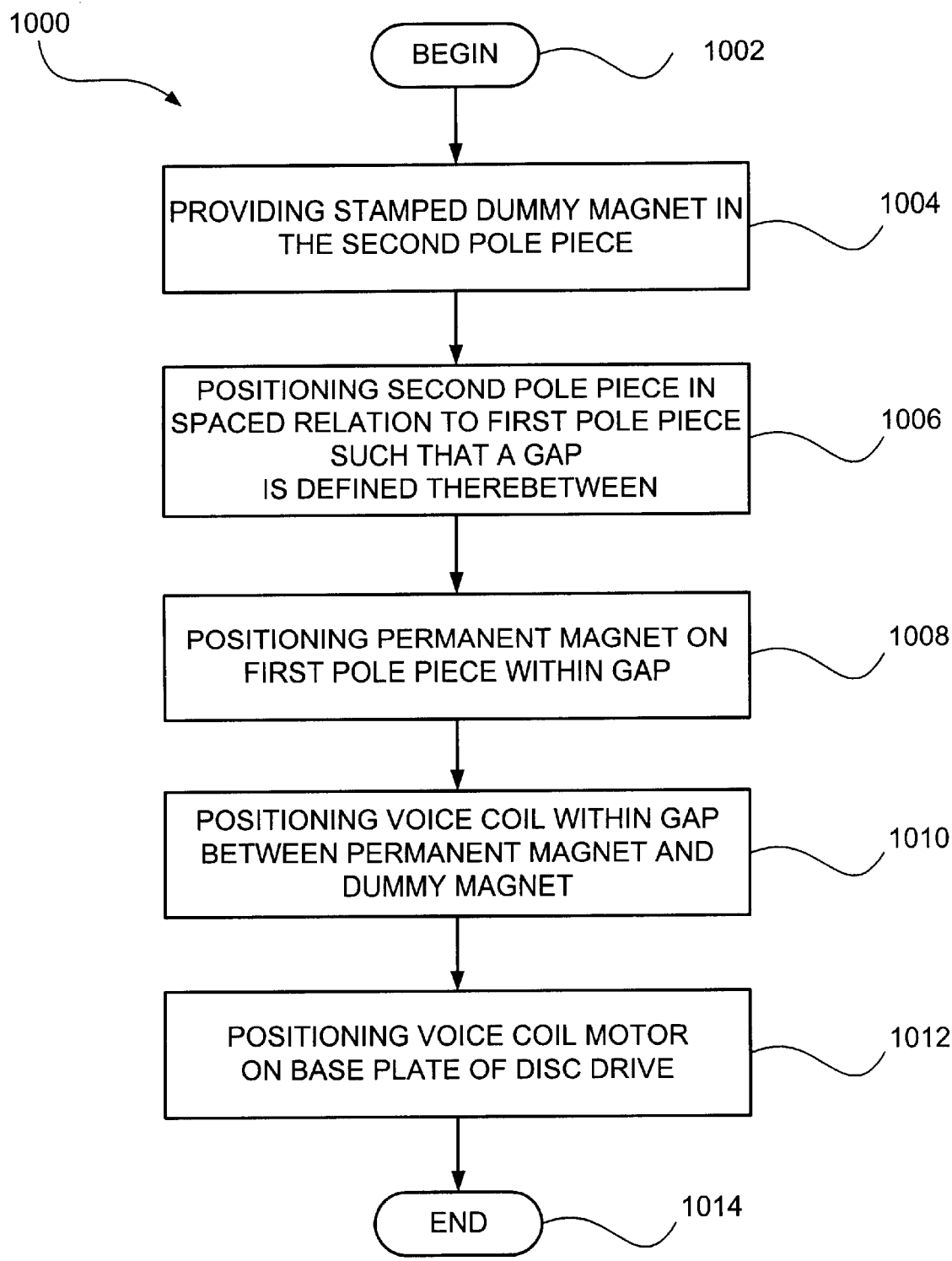
FIG. 10 depicts a flowchart depicting steps taken in performing a method of reducing roll and pitch torque constants of a voice coil motor in accordance with an embodiment of the present invention.

Another embodiment of the present invention relates to a process 1000 or method for reducing the roll and pitch torque constants of a voice coil motor in a disc drive, where the disc drive includes a base plate and the VCM includes a first pole piece, a second pole piece, a permanent magnet, and a voice coil. As shown in FIG. 10, following the beginning 1002 of the process, at forming step 1004 a dummy magnet is stamped in the second pole piece via a mechanical stamping process. At positioning step 1006 the second pole piece is positioned in spaced relation to the first pole piece such that a gap is defined between the first and second pole pieces. During positioning step 1008 the permanent magnet is positioned on the first pole piece within the gap. At positioning step 1010 the voice coil is positioned within the gap between the permanent magnet and the dummy magnet. Finally, at positioning step 1012 the voice coil motor is positioned on the base plate of the disc drive.

As will be clear with reference to FIGS. 6, 7, 8 and 9, the first pole piece discussed above with respect to this method may either be the top pole piece, as shown in FIGS. 6 and 7, or the bottom pole piece, as shown in FIGS. 8 and 9. As will also be clear with reference to FIGS. 6, 7, 8 and 9, the second pole piece discussed above with respect to this method may either be the top pole piece, as shown in FIGS. 8 and 9, or the bottom pole piece, as shown in FIGS. 6 and 7. If the first pole piece is the bottom pole piece and the second pole piece is the top pole piece, as shown in FIGS. 6 and 7, the step 1012 of positioning the voice coil motor on the base plate of the disc drive may involve attaching the bottom pole piece 652 to the base plate 302 of the disc drive 100. If, on the other hand, the second pole piece is the bottom pole piece and the first pole piece is the top pole piece, as shown in FIGS. 8 and 9, the step 1012 of positioning the voice coil motor on the base plate of the disc drive may involve attaching the top pole piece 852 to the base plate 302 of the disc drive 300. Whatever the arrangement of the pole pieces, the step 1012 of positioning the voice coil motor on the base plate of the disc drive may include fixedly attaching the voice coil motor to base plate. Also, as shown in FIGS. 6, 7, 8 and 9, the step of positioning the second pole piece in spaced relation to the first may include attaching one end of a spacer, such as spacer 654 or 854, to the first pole piece and a second of the spacer to the second pole piece. In this manner, the pole pieces may be held in spaced relation to one another such that a gap is defined therebetween.

In summary, in view of the foregoing discussion it will be understood that a first embodiment of the present invention provides a voice coil motor (such as 324 or 824) for use in a data storage device (such as 300), the voice coil having a first pole piece (such as 652 or 842) with an inner surface (such as 660 or 860) and a second pole piece (such as 342 or 852) having an inner surface (such as 658 or 890). In this embodiment the second pole piece is operably connected to the first pole piece so that the inner surface of the second pole piece is held in spaced relation with the inner surface of the first pole piece such that a gap (such as 656 or 856)

is defined therebetween. The second pole piece includes a dummy magnet (such as 370 or 870) extending from its inner surface into the gap. A permanent magnet (such as 328 or 828) is in the gap on the inner surface of the first pole piece and a voice coil (such as 326 or 826) is in the gap between the dummy magnet and the permanent magnet.

The dummy magnet in this embodiment of the present invention may be formed as an integral part of the second pole piece. The voice coil motor in this embodiment may also include a spacer or spacers (such as 654 or 854) which connect the first pole piece and the second pole piece in a manner which retains the second pole piece in spaced relation to the first pole piece. Also, the inner surface of the first pole piece in this embodiment may be substantially planar and the dummy magnet may include a lower surface (such as 796 or 996) substantially parallel with the inner surface of the first pole piece. The second pole piece in this embodiment may include an outer surface (such as 374 or 874) having a recessed area (such as 372 or 872).

In this embodiment of the invention, the first pole piece may include a planar mounting surface (such as 798) substantially parallel with the inner surface of the first pole piece for mounting the first pole piece to a disc drive base plate (such as 302). Alternatively, the second pole piece may include a planar mounting surface (such as 874) substantially parallel with the inner surface of the second pole piece for mounting the second pole piece to a disc drive base plate.

Another embodiment of the present invention provides a method for reducing the roll and pitch torque constants of a voice coil motor (such as 324 or 824) in a disc drive (such as 300), wherein the voice coil motor includes a base plate (such as 302) and the voice coil motor includes a first pole piece (such as 342 or 852), a second pole piece (such as 652 or 842), a permanent magnet (such as 328 or 828), and a voice coil (such as 326 or 826). The method in this embodiment may include a providing step (such as 1004) wherein a second pole piece is provided having a dummy magnet. A positioning step (such as 1006) may then be employed to position the second pole piece in spaced relation to the first pole piece such that a gap (such as 656 or 856) is defined therebetween. Another positioning step (such as 1008) may then be used to position the permanent magnet on the first pole piece in the gap. A positioning step (such as 1010) may then be employed to position the voice coil in the gap between the permanent magnet and the dummy magnet. Finally, a positioning step (such as 1012) may be used to position the voice coil motor on the base plate of the disc drive.

In yet another embodiment of the present invention, a voice coil motor assembly (such as 324 or 824) in a disc drive comprises two pole pieces (such as 324 and 652 or 842 and 852) for a gap therebetween, a permanent magnet (such as 328 or 828) and a coil (such as 326 or 856) extending within the gap, and means (such as 370 or 870) for reducing the pitch and roll torque constants of the voice coil motor by incouraging magnetic flux to flow across the gap.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the size and shape of the dummy magnet may vary depending on the performance characteristics desired. In addition, while the dummy magnet has been described as being integral with either the top or bottom pole pieces, the dummy magnet might comprise a separate piece of magnetically permeable material attached to the top or bottom pole piece. While the various embodiments of the invention have been described with respect to a disc drive employing a VCM having a single magnet pair and a single coil, the present invention the present invention may also be utilized in VCMs having multiple magnet pairs and multiple coils. Furthermore, it is to be understood that the present invention is not limited to disc drives alone. The present invention may be employed in any number of data storage devices which employ VCMs. Additionally, it will be clear to one skilled in the art that the various steps or steps of the methods described above need not necessarily be performed in the order shown or described. Numerous other changes may be made which will readily suggest themselves to those skilled in the art and which are encompassed in the spirit of the invention disclosed and as defined in the appended claims.

What is claimed is:

1. A voice coil motor for use in a data storage device comprising:
   a first pole piece having an inner surface;
   a second pole piece having an inner surface, the second pole piece operably connected to the first pole piece so that the inner surface of the second pole piece is held in spaced relation with the inner surface of the first pole piece such that a gap is defined therebetween;
   a dummy magnet formed from a portion of the second pole piece, the dummy magnet having a depth equal to the depth of the second pole piece and protruding from the inner surface of the second pole piece into the gap, the portion of the second pole piece formed into the dummy magnet has a recessed outer surface relative to an outer surface of the second pole piece and a protruding inner surface to form an inner surface of the dummy magnet;
   a permanent magnet in the gap on the inner surface of the first pole piece; and
   a voice coil in the gap between the dummy magnet and the permanent magnet.

2. The voice coil motor of claim 1, wherein the dummy magnet is stamped as an integral part of the second pole piece.

3. The voice coil motor of claim 1, further comprising a spacer operably connected between the first pole piece and the second pole piece, so as to retain the second pole piece in spaced relation to the first pole piece.

4. The voice coil motor of claim 3, wherein the first pole piece, the second pole piece, and the spacer are composed of magnetically permeable material.

5. The voice coil motor of claim 1, wherein the inner surface of the first pole piece is substantially planar and wherein the inner surface of the dummy magnet is substantially parallel with the inner surface of the first pole piece.

6. The voice coil motor of claim 5, wherein the a recessed outer surface of the second pole piece includes a planar surface substantially parallel to the inner surface of the dummy magnet.

7. The voice coil motor of claim 1, wherein the first pole piece includes a planar mounting surface substantially parallel with the inner surface of the first pole piece for mounting the first pole piece to a disc drive base plate.

8. The voice coil motor of claim 1, wherein the second pole piece includes a planar mounting surface substantially parallel with the inner surface of the second pole piece for mounting the second pole piece to a disc drive base plate.

9. A method for reducing the roll and pitch torque constants of a voice coil motor in a disc drive having a base plate, the voice coil motor including a first pole piece, a second pole piece, a permanent magnet, and a voice coil, the method comprising steps of:

(a) stamping a dummy magnet in the second pole piece, the dummy magnet having a depth substantially the same as the depth of the second pole piece and protruding from the second pole piece;

(b) positioning the second pole piece in spaced relation to the first pole piece such that a gap is defined therebetween and the dummy magnet protrudes into the gap;

(c) positioning the permanent magnet on the first pole piece in the gap opposite the dummy magnet; and (d) positioning the voice coil in the gap between the permanent magnet and the dummy magnet.

10. The method of claim 9, further comprising a step:

(e) attaching the first pole piece to the base plate of the disc drive.

11. The method of claim 9, further comprising a step:

(e) attaching the second pole piece to the base plate of the disc drive.

12. The method of claim 11, wherein the attaching step (e) comprise fixedly attaching the second pole piece to the base plate of the disc drive.

13. The method of claim 9, wherein the voice coil motor further comprises a spacer having a first end and a second end, and wherein the positioning step (b) comprises steps of:

(b)(1) attaching the first end of the spacer to the first pole piece; and (b)(2) attaching the second end of the spacer to the second pole piece, such that the second pole piece is held in spaced relation to the first pole piece and a gap is defined therebetween.

* * * * *